United States Patent [19]
Burkholder

[11] Patent Number: 5,974,843
[45] Date of Patent: Nov. 2, 1999

[54] BICYCLE LOCK

[76] Inventor: Everett L. Burkholder, 234 Road 3800, Farimington, N.Mex. 87402

[21] Appl. No.: 09/057,770

[22] Filed: Apr. 9, 1998

[51] Int. Cl.$^6$ ..................................................... B62H 5/00
[52] U.S. Cl. ............................................... 70/233; 70/185
[58] Field of Search .............................. 70/185, 186, 233, 70/234, 210, 211

[56] References Cited

U.S. PATENT DOCUMENTS

| | | | |
|---|---|---|---|
| 585,054 | 6/1897 | Stevens | 70/233 |
| 610,068 | 8/1898 | Lapaugh | 70/233 |
| 1,192,718 | 7/1916 | Wehner | 70/233 |
| 1,459,584 | 6/1923 | Ericsson | 70/233 |
| 2,143,502 | 1/1939 | Taman | 70/185 X |
| 2,231,546 | 2/1941 | Neiman | 70/233 |
| 2,576,773 | 11/1951 | Buxton | 70/233 X |
| 3,863,472 | 2/1975 | Klingfus | 70/233 X |
| 3,910,081 | 10/1975 | Pender | 70/233 X |
| 4,012,930 | 3/1977 | Benson | 70/234 |
| 4,037,441 | 7/1977 | Ray | 70/233 |
| 4,055,060 | 10/1977 | Bellino | 70/185 X |
| 4,086,795 | 5/1978 | Foster et al. | 70/233 |
| 4,232,537 | 11/1980 | Plaiss | 70/233 |
| 4,509,349 | 4/1985 | Partridge | 70/185 X |

*Primary Examiner*—Suzanne Dino Barrett

[57] ABSTRACT

A bicycle anti-theft system is provided including a housing mounted to a cross bar of a bicycle such one of the end faces thereof abuts a fork sleeve of the bicycle. Also included is a locking rod movably situated within the housing and adapted to be moved between a retracted orientation wherein the rod is situated within the housing and an extended orientation. In the extended orientation, the locking rod is adapted for protruding from one of the end faces of the housing and being inserted within a bore formed in both the fork sleeve and a fork of the bicycle for precluding rotation of a handle of the bicycle. A lock unit is provided for selectively transferring the locking rod between the extended and retracted orientation thereof.

1 Claim, 3 Drawing Sheets

5,974,843

BICYCLE LOCK

BACKGROUND OF THE INVENTION

1. Field of the Invention

The present invention relates to locking mechanisms and more particularly pertains to a new bicycle lock for preventing the theft of a bicycle by preventing the handle bars thereof from being turned.

2. Description of the Prior Art

The use of locking mechanisms is known in the prior art. More specifically, locking mechanisms heretofore devised and utilized are known to consist basically of familiar, expected and obvious structural configurations, notwithstanding the myriad of designs encompassed by the crowded prior art which have been developed for the fulfillment of countless objectives and requirements.

Known prior art locking mechanisms include U.S. Pat. No. 5,279,137; U.S. Pat. No. 5,085,063; U.S. Pat. No. 4,022,486; U.S. Pat. No. 4,708,004; U.S. Pat. No. 4,024,741; and U.S. Pat. Des. 332,043.

In these respects, the bicycle lock according to the present invention substantially departs from the conventional concepts and designs of the prior art, and in so doing provides an apparatus primarily developed for the purpose of preventing the theft of a bicycle by preventing the handle bars thereof from being turned.

SUMMARY OF THE INVENTION

In view of the foregoing disadvantages inherent in the known types of locking mechanisms now present in the prior art, the present invention provides a new bicycle lock construction wherein the same can be utilized for preventing the theft of a bicycle by preventing the handle bars thereof from being turned.

The general purpose of the present invention, which will be described subsequently in greater detail, is to provide a new bicycle lock apparatus and method which has many of the advantages of the locking mechanisms mentioned heretofore and many novel features that result in a new bicycle lock which is not anticipated, rendered obvious, suggested, or even implied by any of the prior art locking mechanisms, either alone or in any combination thereof.

To attain this, the present invention generally comprises a housing having a cylindrical configuration with pair of circular end faces and a periphery formed therebetween. The housing has a pair of O-ring brackets each having a lower end coupled to a top of the housing and extending upwardly therefrom. Each bracket has a slit formed therein defining a pair of free edges. Each of the free edges has an apertured tab extending therefrom. The O-ring bracket is adapted to be screwably mounted to a cross bar of a bicycle. As such, the housing resides beneath and in parallel with the cross bar. Further, one of the end faces of the housing abuts a fork sleeve of the bicycle. Next provided is a sliding locking rod slidably situated within the housing. The sliding locking rod is adapted to be slid between a retracted orientation wherein the rod is situated within the housing and an extended orientation. In the extended orientation, the locking rod protrudes from one of the end faces of the housing and is further inserted within a bore formed in both the fork sleeve and the fork. This precludes rotation of a handle of the bicycle. Finally, a lock unit is provided including a key hole mechanism situated within the housing and extending radially from a side of the housing. In use, the lock unit serves to releasably receive a key which may be rotated in a first direction for precluding the rotation of the handle. When rotated in the first direction, the lock unit further precludes the transfer of the locking rod from the second orientation to the first orientation. The key hole mechanism further has a second direction for allowing the rotation of the handle of the bicycle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bicycle lock apparatus and method which has many of the advantages of the locking mechanisms mentioned heretofore and many novel features that result in a new bicycle lock which is not anticipated, rendered obvious, suggested, or even implied by any of the prior art locking mechanisms, either alone or in any combination thereof.

It is another object of the present invention to provide a new bicycle lock which may be easily and efficiently manufactured and marketed.

It is a further object of the present invention to provide a new bicycle lock which is of a durable and reliable construction.

An even further object of the present invention is to provide a new bicycle lock which is susceptible of a low cost of manufacture with regard to both materials and labor, and which accordingly is then susceptible of low prices of sale to the consuming public, thereby making such bicycle lock economically available to the buying public.

Still yet another object of the present invention is to provide a new bicycle lock which provides in the apparatuses and methods of the prior art some of the advantages thereof, while simultaneously overcoming some of the disadvantages normally associated therewith.

Still another object of the present invention is to provide a new bicycle lock for preventing the theft of a bicycle by preventing the handle bars thereof from being turned.

Even still another object of the present invention is to provide a new bicycle lock that includes a housing mounted to a cross bar of a bicycle such one of the end faces thereof abuts a fork sleeve of the bicycle. Also included is a locking rod movably situated within the housing and adapted to be moved between a retracted orientation wherein the rod is situated within the housing and an extended orientation. In the extended orientation, the locking rod is adapted for protruding from one of the end faces of the housing and being inserted within a bore formed in both the fork sleeve and a fork of the bicycle for precluding rotation of a handle of the bicycle. A lock unit is provided for selectively transferring the locking rod between the extended and retracted orientation thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
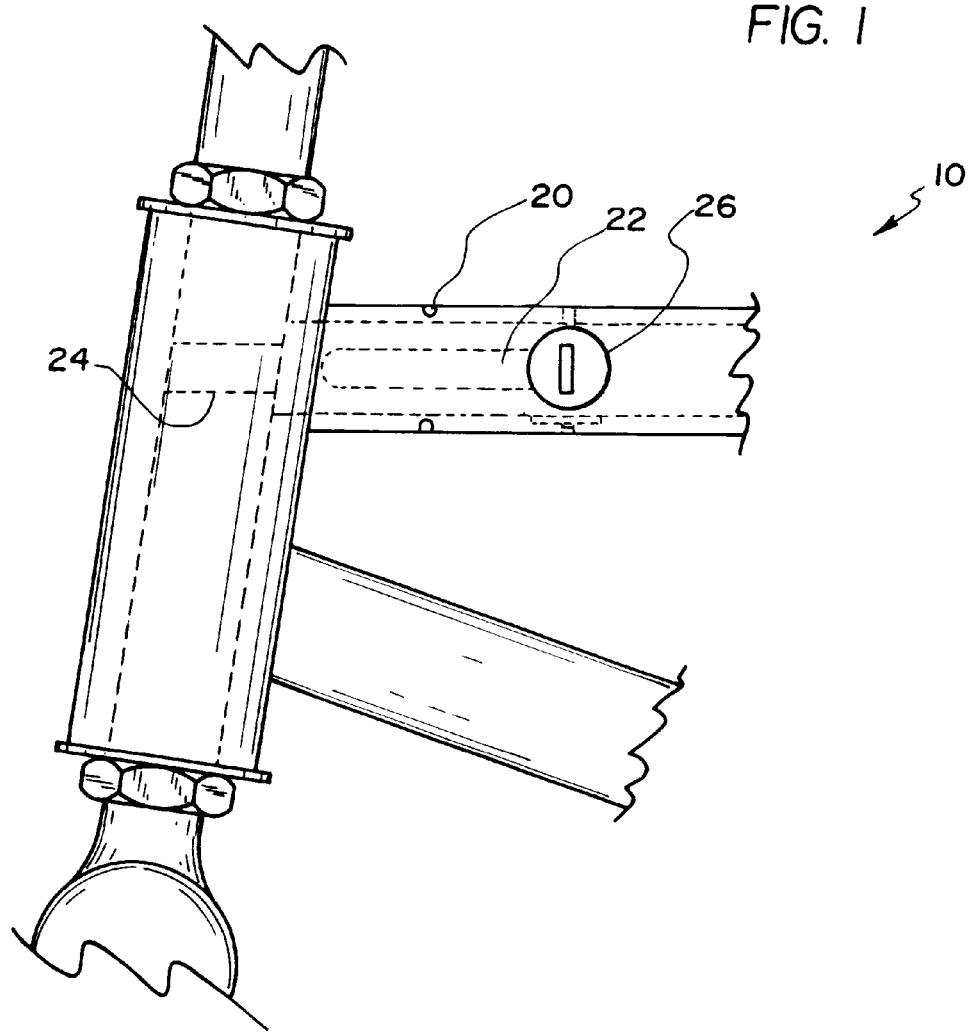
FIG. 1 is a side view of a new bicycle lock according to the present invention
Figure 2:
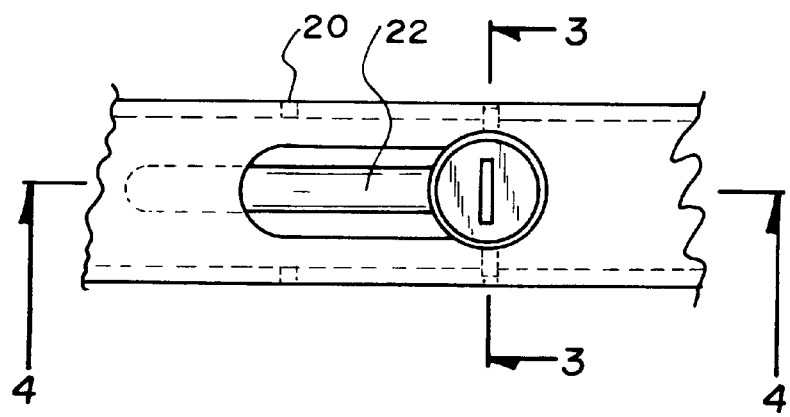
FIG. 2 is a side view of the present invention.
Figure 3:
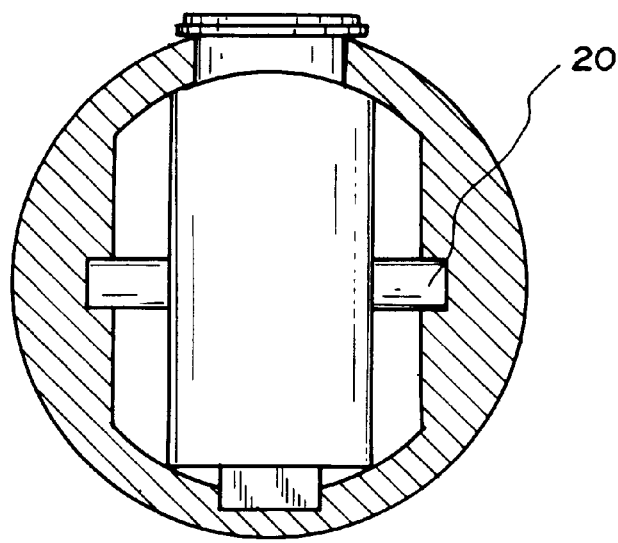
FIG. 3 is a cross-sectional view of the present invention taken along line 3—3 shown in FIG. 2.
Figure 4:
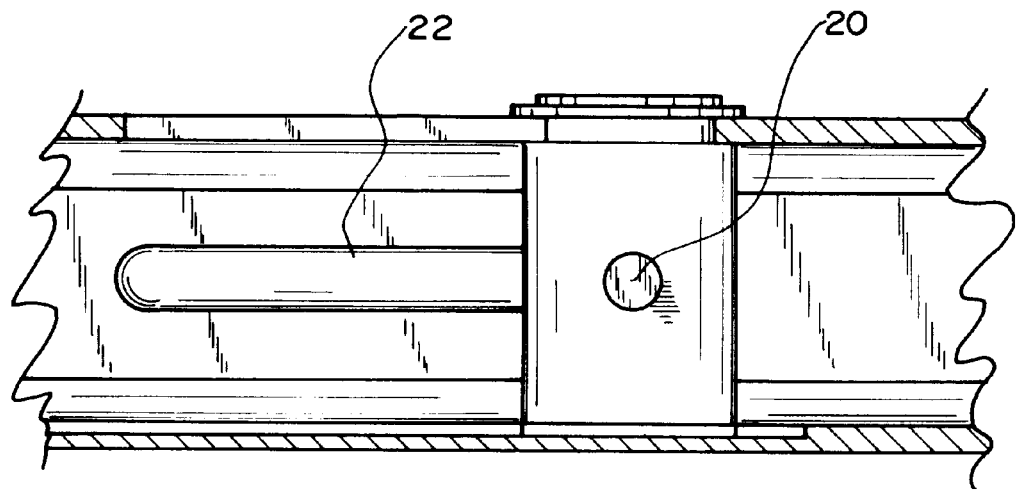
FIG. 4 is yet another cross-sectional view of the present invention b taken along line 4—4 shown in FIG. 2.
Figure 5:
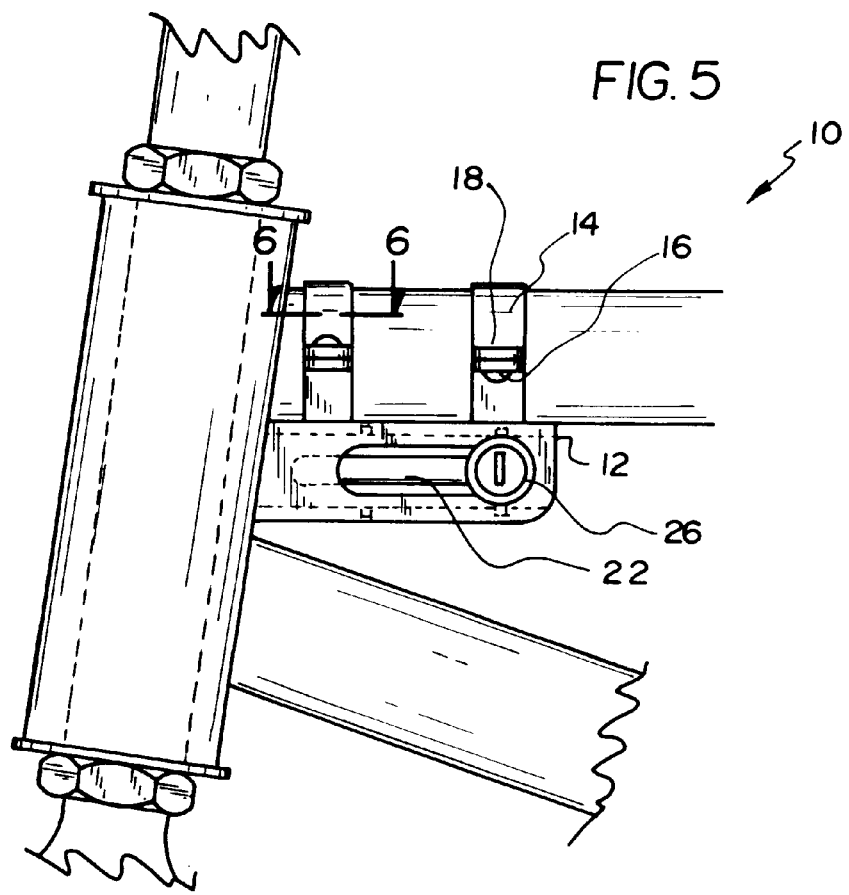
FIG. 5 is a side view of another embodiment of the present invention.

With reference now to the drawings, and in particular to FIGS. 1 through 6 thereof, a new bicycle lock embodying the principles and concepts of the present invention and generally designated by the reference numeral 10 will be described.

The present invention, designated as numeral 10, includes a housing 12 having a cylindrical configuration with pair of circular end faces and a periphery formed therebetween. The housing has a pair of O-ring brackets 14 each having a lower end coupled to a top of the housing and extending upwardly therefrom. Each bracket has a slit 16 formed therein defining a pair of free edges. Each of the free edges has an apertured tab 18 extending therefrom.

Figure 6:
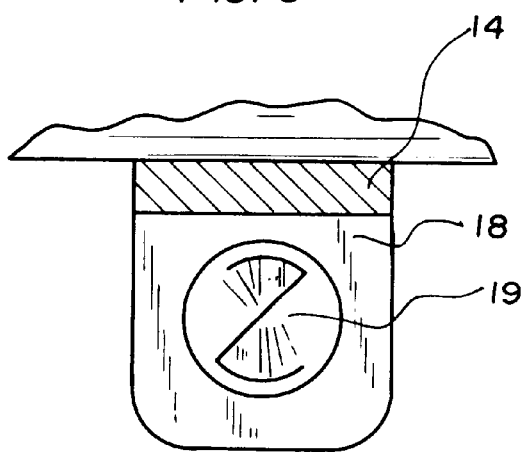
FIG. 6 is a top view of the embodiment of the present invention shown in FIG. 5.

The O-ring bracket is adapted to be screwably mounted to a cross bar of a bicycle. As such, the housing resides beneath and in parallel with the cross bar. Further, one of the end faces of the housing abuts a fork sleeve of the bicycle. In the preferred embodiment, the screws which are employed with the present invention include one-way screws 19, as shown in FIG. 6, which provides a abutting edge only when the screw is rotated in a tightening direction.

In another embodiment, shown in FIGS. 1–4, the housing is adapted to be situated within the cross bar in coaxial relationship therewith. To maintain the housing within the cross bar, the housing has a pair of locking pins 20 extending radially therefrom for the purpose of being situated within diametrically disposed apertures formed in the cross bar. The present invention thus provides a locking unit which may be retrofitted to an existing bicycle or included at time of manufacture.

Next provided is a sliding locking rod 22 slidably situated within the housing. The sliding locking rod is adapted to be slid between a retracted orientation wherein the rod is situated within the housing and an extended orientation. In the extended orientation, the locking rod protrudes from one of the end faces of the housing and is further inserted within a bore 24 formed in both the fork sleeve and the fork of the bicycle. This precludes rotation of a handle of the bicycle.

Finally, a lock unit 26 is provided including a key hole mechanism situated within the housing and extending radially from a side of the housing. In use, the lock unit serves to releasably receive a key which may be rotated in a first direction for precluding the rotation of the handle by transferring the locking rod to its second orientation. When rotated in the first direction, the lock unit further precludes the transfer of the locking rod from the second orientation to the first orientation. The key hole mechanism further has a second direction for allowing the rotation of the handle of the bicycle by transferring the locking rod from the second orientation to the first orientation. It should be understood that various other push button locks, combination locks and the like may be utilized in lieu of the key hole mechanism.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bicycle anti-theft system comprising:

a bicycle having a frame with a hollow tubular cross bar intersecting a fork sleeve, a fork tube extending through the fork sleeve in a manner permitting rotation of the fork tube in the fork sleeve, the cross bar having a slot formed through a perimeter wall of the cross bar, and a recess formed in an interior surface of the tubular cross bar opposite the slot in the perimeter wall of the cross bar;

a locking rod movably situated within the tubular cross bar and adapted to be moved between a retracted orientation wherein the rod is situated within the cross bar for allowing rotation of a handle of the bicycle mounted on the fork tube and an extended orientation wherein the locking rod protrudes from the cross bar and inserts into a bore formed in both the fork sleeve and the fork tube of the bicycle to prevent rotation of the fork tube in the fork sleeve for thereby precluding rotation of the handle of the bicycle mounted on the fork tube; and a lock unit mounted on an end of the locking rod with a first end slidably situated in the recess of the cross bar and a second end extending through the slot and being slidably movable along the length of the slot as the locking rod moves between the retracted and extended orientations, the lock unit having a first mode for allowing the transfer of the locking rod between the extended orientation and the retracted orientation, and a second mode for precluding the transfer of the locking rod to the retracted orientation thereof, the lock unit having a pair of selectively extendible ears being adapted to selectively extend radially from the lock unit to engage a pair of opposed recesses in the interior surface of the tubular cross bar such that the ears prevent sliding movement of the lock unit and locking rod in the tubular cross bar, the first mode being characterized by the ears being retracted into the lock unit and the second mode being characterized by the ears being extended from the lock unit, the tubular cross bar having a first pair of opposed recesses positioned to accept the ears of the lock unit when the locking rod is in the retracted orientation and the tubular cross bar having a second pair of opposed recesses positioned to accept the ears of the lock unit when the locking rod is in the extended orientation.

\* \* \* \* \*